United States Patent
Menendez et al.

(10) Patent No.: US 9,241,286 B2
(45) Date of Patent: Jan. 19, 2016

(54) ASSOCIATING A VOIP PROVIDER WITH A SET OF VOIP NETWORKS AS A PREFERRED OR DEFAULT VOIP PROVIDER

(71) Applicant: QUALCOMM Incorporated, San Diego, CA (US)

(72) Inventors: Jose R Menendez, Encinitas, CA (US); Ram Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/794,547

(22) Filed: Mar. 11, 2013

(65) Prior Publication Data

US 2014/0254435 A1    Sep. 11, 2014

(51) Int. Cl.

| | |
|---|---|
| H04L 12/28 | (2006.01) |
| H04W 28/24 | (2009.01) |
| G06Q 30/00 | (2012.01) |
| H04M 3/42 | (2006.01) |
| H04M 7/00 | (2006.01) |
| H04M 15/00 | (2006.01) |
| H04L 29/06 | (2006.01) |

(52) U.S. Cl.
CPC ............ *H04W 28/24* (2013.01); *G06Q 30/00* (2013.01); *H04L 65/1069* (2013.01); *H04L 65/80* (2013.01); *H04M 3/42289* (2013.01); *H04M 7/006* (2013.01); *H04M 15/56* (2013.01); *H04M 15/805* (2013.01); *H04M 15/8044* (2013.01); *H04M 15/84* (2013.01)

(58) Field of Classification Search
CPC ..... H04W 28/24; H04W 36/00; H04W 36/14; H04W 72/02; H04W 72/04
USPC .................. 370/259, 329, 331, 352
See application file for complete search history.

(56) References Cited

U.S. PATENT DOCUMENTS

| | | | |
|---|---|---|---|
| 7,586,903 B2 | 9/2009 | Song et al. | |
| 2007/0242626 A1* | 10/2007 | Altberg et al. | 370/259 |
| 2007/0286168 A1* | 12/2007 | Shibata | 370/352 |

(Continued)

FOREIGN PATENT DOCUMENTS

| | | |
|---|---|---|
| KR | 20050002548 A1 | 1/2005 |
| KR | 20070111778 A | 11/2007 |

OTHER PUBLICATIONS

International Search Report and Written Opinion—PCT/US2014/022012—ISA/EPO—May 23, 2014.

*Primary Examiner* — Kevin C Harper
(74) *Attorney, Agent, or Firm* — The Marbury Law Group, PLLC

(57) ABSTRACT

In an embodiment, a Voice over Internet Protocol (VoIP) bidder negotiates with a VoIP provider and/or a VoIP access network to establish the VoIP provider as a preferred or default VoIP provider for the VoIP access network (e.g., a set of particular WiFi APs, a non-roaming cellular access network, etc.). As the preferred or default VoIP provider, the VoIP access network gives preferential performance and/or contract terms (or VoIP opportunities) for providing VoIP service to user equipments (UEs) via the VoIP provider as compared to one or more other VoIP providers that are also configured to provide VoIP service to the UEs over the VoIP access network. In a further embodiment, one of the UEs connects to the VoIP access network and advertises, to a user of the UE, the preferential performance and/or contract terms available to the UE via the VoIP provider over the VoIP access network.

26 Claims, 10 Drawing Sheets

(56) References Cited

U.S. PATENT DOCUMENTS

| | | | |
|---|---|---|---|
| 2010/0303064 A1* | 12/2010 | Bari | 370/352 |
| 2011/0082918 A1 | 4/2011 | Karaoguz | |
| 2011/0261809 A1 | 10/2011 | den Hartog | |
| 2011/0299458 A1 | 12/2011 | Shekalim | |
| 2012/0063432 A1 | 3/2012 | Hurd et al. | |
| 2012/0250609 A1 | 10/2012 | George et al. | |
| 2014/0256320 A1* | 9/2014 | Ashrafi | 455/435.1 |

* cited by examiner

ASSOCIATING A VOIP PROVIDER WITH A SET OF VOIP NETWORKS AS A PREFERRED OR DEFAULT VOIP PROVIDER

BACKGROUND OF THE INVENTION

1. Field of the Invention

Embodiments of the invention relate to associating a Voice over Internet Protocol (VoIP) provider with a set of VoIP networks as a preferred or default VoIP provider.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

Currently, cellular carriers (e.g., Sprint, Verizon, AT&T, etc.) that provide service via any of the aforementioned wireless communication systems lose control of the communication experience when users choose to use VoIP providers (e.g., FaceTime on iOS, Google Voice on Android, Skype on Windows Phone, etc.) via their cellular provider's data network or choose to bypass the cellular network altogether by using VoIP providers over other IP networks that support VoIP services (e.g. WiFi hotspots, etc.). Similarly, original equipment manufacturers (OEMs) have little control over which VoIP providers are used on their devices.

SUMMARY

In an embodiment, a Voice over Internet Protocol (VoIP) bidder negotiates with a VoIP provider and/or a VoIP access network to establish the VoIP provider as a preferred or default VoIP provider for the VoIP access network (e.g., a set of particular WiFi APs, a non-roaming cellular access network, etc.). As the preferred or default VoIP provider, the VoIP access network gives preferential performance and/or contract terms (or VoIP opportunities) for providing VoIP service to user equipments (UEs) via the VoIP provider as compared to one or more other VoIP providers that are also configured to provide VoIP service to the UEs over the VoIP access network. In a further embodiment, one of the UEs connects to the VoIP access network and advertises, to a user of the UE, the preferential performance and/or contract terms available to the UE via the VoIP provider over the VoIP access network.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
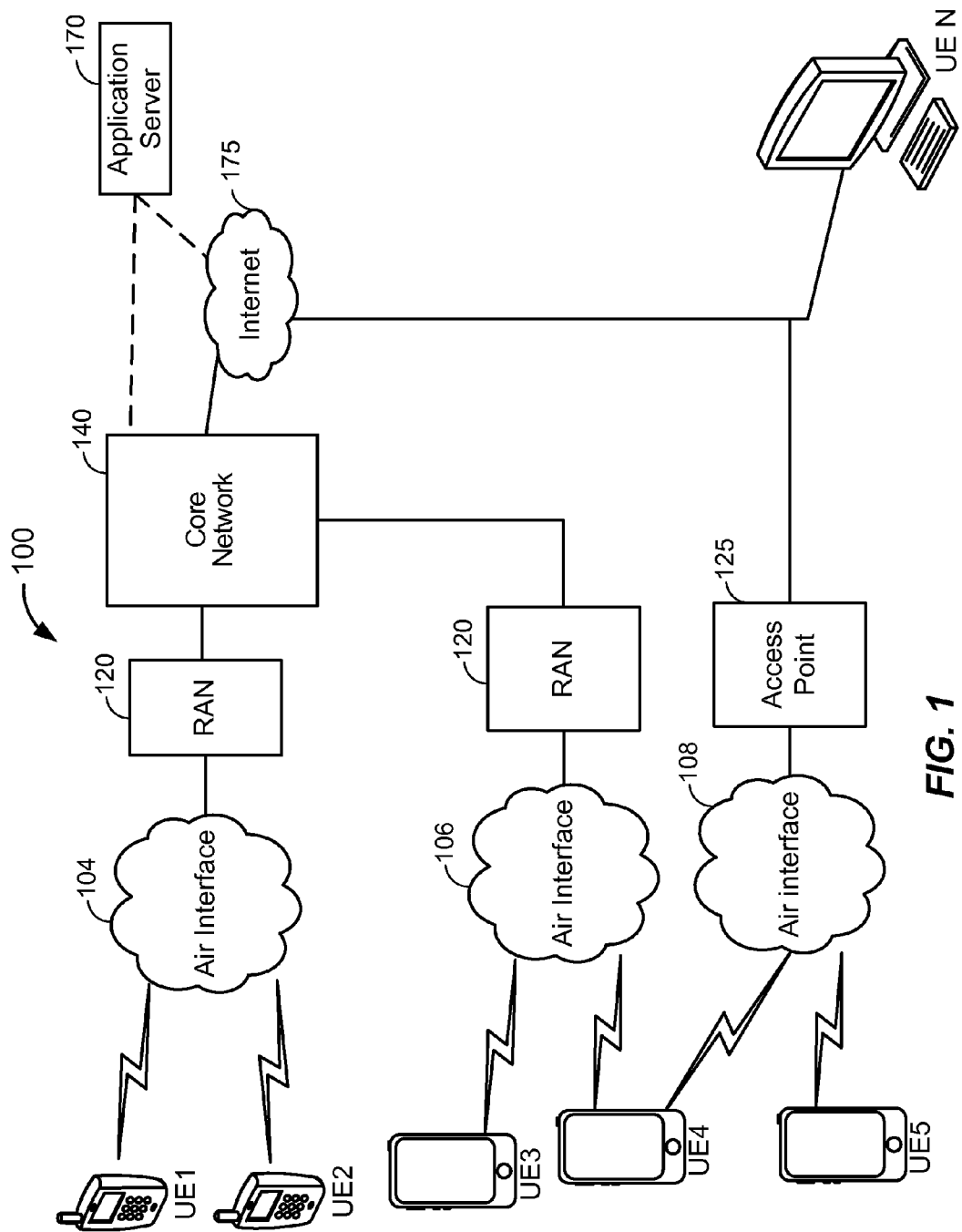
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
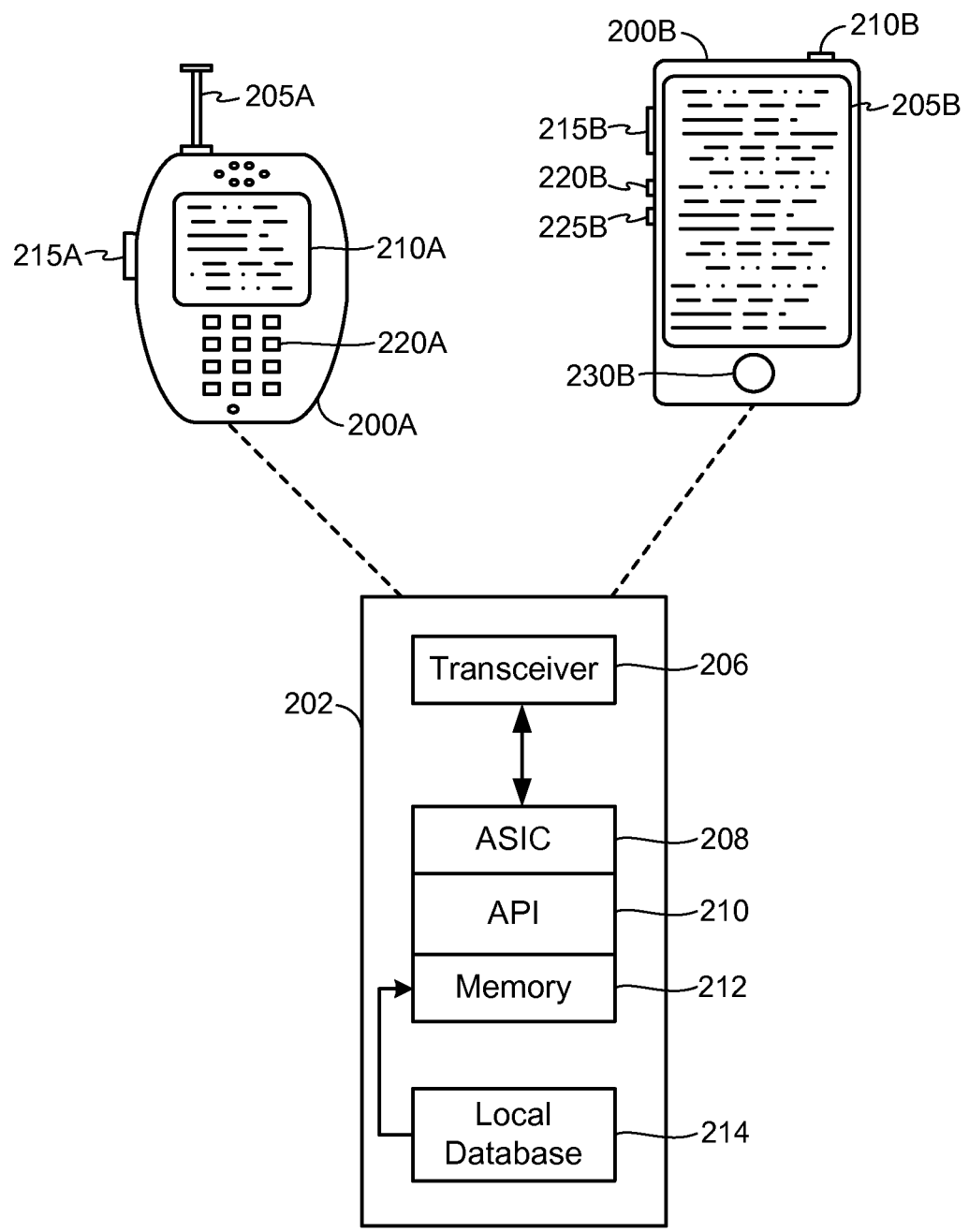
FIG. 2 illustrates examples of user equipments (UEs) in accordance with embodiments of the invention.

FIG. 2 illustrates examples of UEs (i.e., client devices) in accordance with embodiments of the invention. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the invention is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
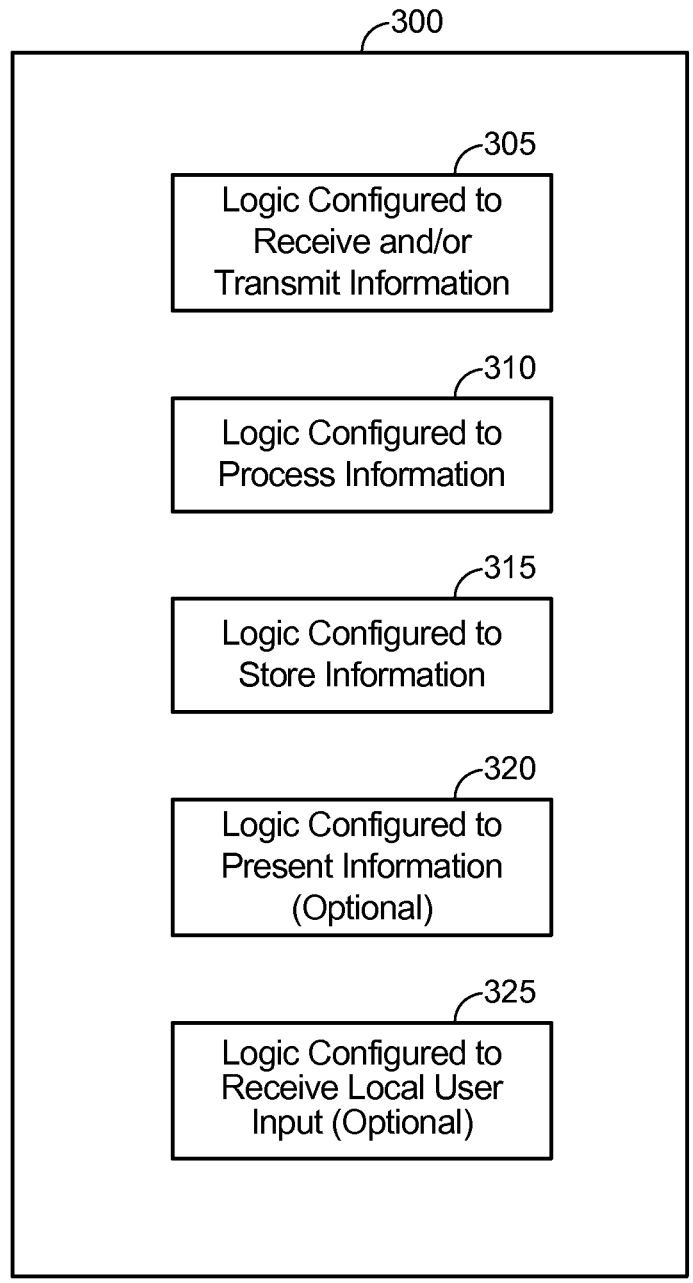
FIG. 3 illustrates a communication device that includes logic configured to perform functionality in accordance with an embodiment of the invention.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, AP 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Currently, cellular carriers (e.g., Sprint, Verizon, AT&T, etc.) that provide service via any of the aforementioned wireless communication systems lose control of the communication experience when users choose to use VoIP providers (e.g., Facetime on iOS, Google Voice on Android, Skype on Windows Phone, etc.) via their cellular provider's data network or choose to bypass the cellular network altogether by using VoIP providers over other IP networks that support VoIP services (e.g., WiFi hotspots, etc.). Similarly, original equipment manufacturers (OEMs) of Open Market Handsets (OMHs) (i.e., UEs that are sold as unlocked devices that users can use on any compatible carrier network without carrier restrictions by inserting an appropriate SIM card) have little control over which VoIP providers are used on their devices. Further, VoIP providers themselves typically have little control over the individual VoIP access networks through which their subscribers obtain access to their VoIP services.

Figure 4:
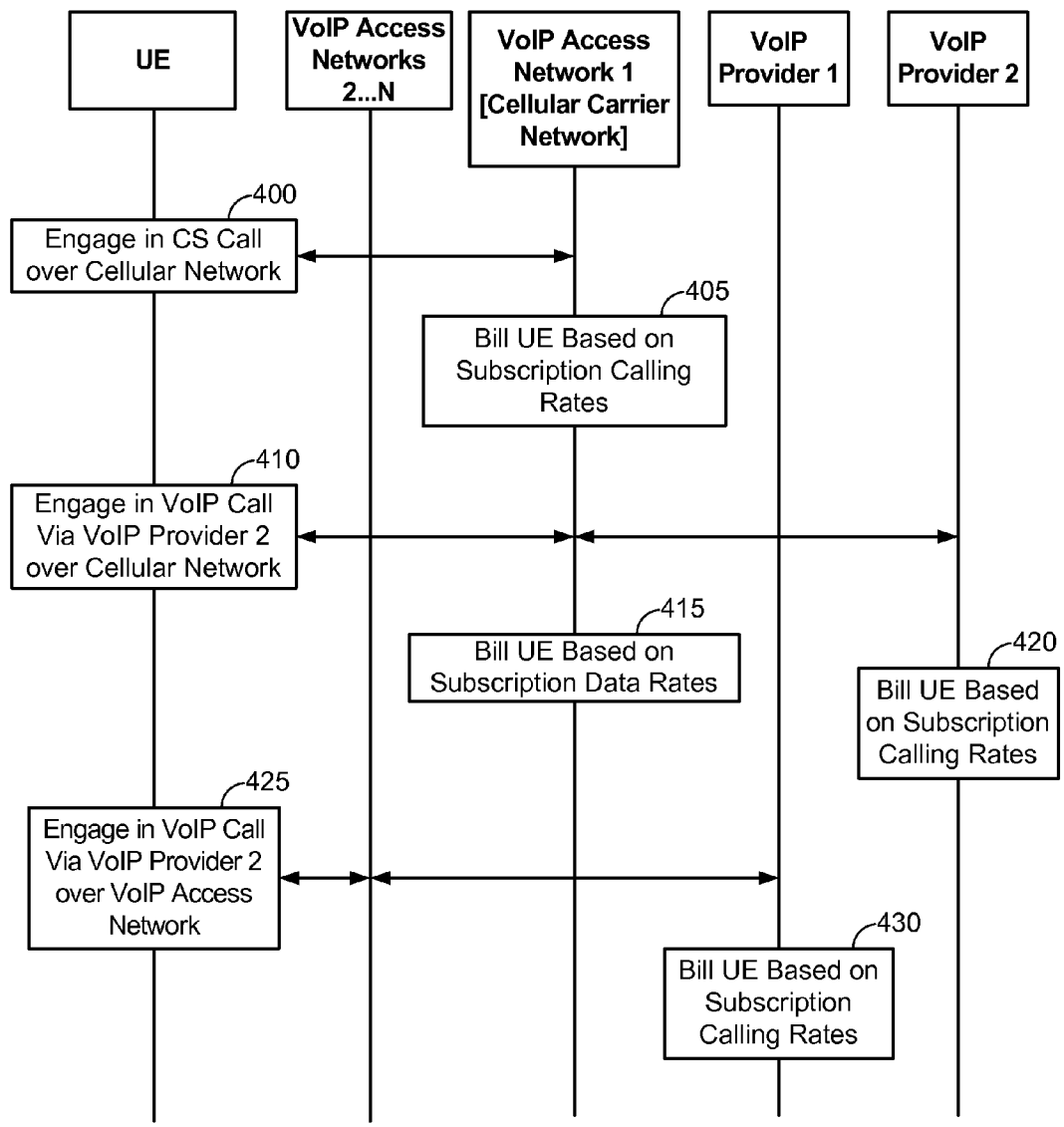
FIG. 4 illustrates conventional call operations that occur with respect to a given UE that subscribes to a cellular carrier network and a plurality of VoIP providers.

FIG. 4 illustrates conventional call operations that occur with respect to a given user equipment (UE) that subscribes to a cellular carrier network and a plurality of VoIP providers (e.g., Google Voice, Facetime, Skype, etc.). Referring to FIG. 4, the given UE engages in a circuit-switched (CS) call over a cellular carrier network (e.g., Sprint, Verizon, AT&T, etc.), 400, and the cellular carrier network bills the given UE for the CS call based on the calling rates associated with the given UE's cellular carrier subscription, 405. At some later point in time, the given UE engages in a VoIP call via VoIP Provider 2 (e.g., Skype, Google Voice, Facetime, etc.) over the cellular carrier network, which is also referred to a VoIP access network 1, 410, the cellular carrier network bills the given UE for the VoIP call based on the data rates associated with the given UE's cellular carrier subscription, 415, and VoIP Provider 2 bills the given UE for the VoIP call based on the calling rates associated with the given UE's VoIP subscription with VoIP Provider 2, 420. At some later point in time, the given UE engages in another VoIP call via VoIP Provider 1 (e.g., Skype, Google Voice, Facetime, etc.) over one of VoIP access networks 2 . . . N (e.g., a WiFi access point, a $3^{rd}$ party voice service, a different cellular carrier, etc.), 425, and VoIP Provider 1 bills the given UE for the VoIP call based on the calling rates associated with the given UE's VoIP subscription with VoIP Provider 1, 430.

As will be appreciated, neither the cellular carrier in FIG. 4, the VoIP providers 1 and 2, nor an OEM (e.g., Samsung, Motorola, Nokia, etc.) that manufactured the given UE is necessarily in a position to dictate the given UE to use particular VoIP providers when connected to particular VoIP access networks. Accordingly, embodiments of the invention are directed to a negotiation (or auction) between the OEMs and/or the cellular carriers and one or more VoIP access networks that establish a preferred (or default) VoIP provider within those VoIP access networks. As part of the negotiation (or auction) procedure, preferential settings (e.g., performance levels such as Quality of Service (QoS) and/or contract terms such as pricing) can be allocated to the preferred or default VoIP provider. The preferential settings can be made available to the subscribers (or purchasers) of the UE(s) associated with the OEM and/or cellular carrier that took part in the negotiation. An example of the above-negotiation procedure is provided below with respect to FIG. 5.

Figure 5:
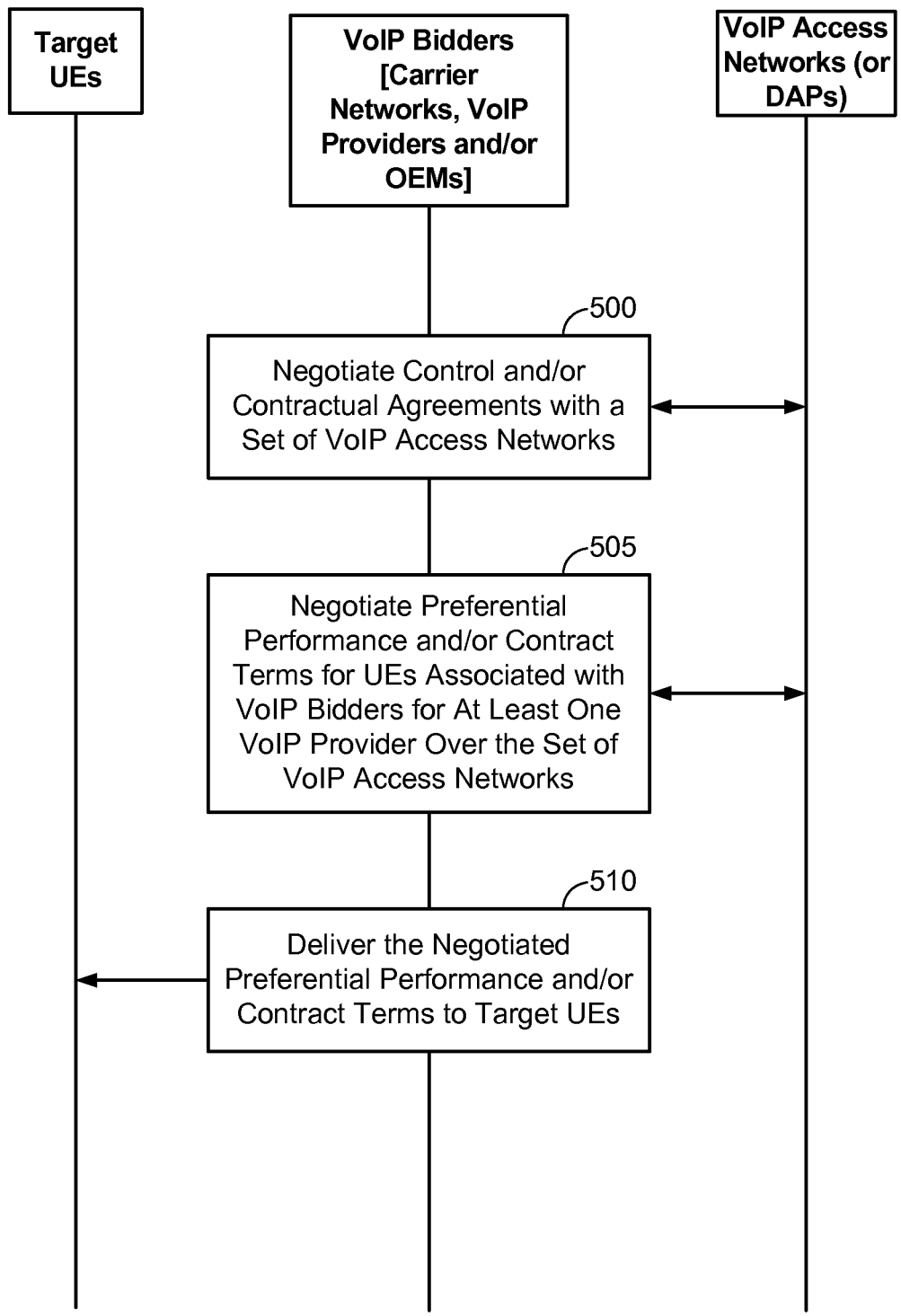
FIG. 5 illustrates a procedure by which one or more Voice over Internet Protocol (VoIP) bidders negotiates preferential performance and/or control terms for at least one VoIP provider over a set of VoIP access networks in accordance with an embodiment of the invention.

Referring to FIG. 5, a set of VoIP bidders each negotiate control and/or contractual agreements with one or more data access providers (DAPs), 500. DAPs include any entity that provides data network access, including cellular carriers (e.g., Verizon, Sprint, etc.), WiFi access points (e.g., any public or private WiFi access network, such as those provided by Boingo and many small businesses and public libraries) or any other data access point (e.g., a wired network available at many hotels or other businesses, as well as local cable companies). DAPs may alternatively be referred to as "VoIP access networks", with the understanding that the VoIP access network (or DAP) can correspond to any network capable of providing UEs access to some degree of VoIP service.

The VoIP bidders can include any party or entity that is seeking to offer preferential treatment to a user or set of users who select a preferred VoIP service, be it the VoIP bidder's own VoIP service or one provided by another VoIP provider. As such, VoIP bidders may include OMH OEMs (e.g., Samsung, Motorola, etc.), any interested DAP or VoIP provider, as well as any other party interested in promoting a particular VoIP service. For example, referring to 500 of FIG. 5, a first VoIP bidder might be a DAP (or VoIP access network) that has deployed a plurality of WiFi hotspots. In another example, a second VoIP bidder may be a VoIP provider seeking to enter into a shared-use agreement with an independent operator of WiFi hotspots (e.g., the local cable company, or public library, etc.), and so on. In another example, a third VoIP bidder could be a DAP (e.g. Boingo) seeking to market its services by entering into an agreement with another DAP in another market or territory (e.g., hot spots operated by a public library). Each of the respective VoIP bidders can setup their control and/or contractual agreements with different, non-overlapping sets of DAPs (or VoIP access networks). Alternatively, the sets of DAPs for two or more VoIP bidders may overlap (at least in part), which can result in more than one VoIP provider being preferred for a particular DAP. In this case, different UEs could be provided with different preferential VoIP provider settings based on their relationships to different VoIP bidders, or different tiers of preferred settings in the particular DAP for UEs having relationships with the two or more VoIP bidders (e.g., if Sprint sets up preferential VoIP parameters for Google Voice and Skype sets up preferential VoIP parameters for itself on the same DAP, a Sprint subscriber UE that also subscribes to Skype may benefit from both sets of preferential VoIP parameters).

After establishing the control and/or contractual agreements with the set of VoIP access networks (or DAPs) in 500, each of the VoIP bidders negotiates preferential performance and/or contract terms for UEs associated with the respective VoIP bidders for a particular set of VoIP providers, 505. For example, a first VoIP bidder (e.g., an OEM, cellular carrier or VoIP provider) may be in control of a first set of WiFi hotspots from 500, and may offer half-priced Skype VoIP service with a threshold level of QoS, a second VoIP bidder may obtain a contractual agreement for a second set of WiFi hotspots to provide service to its subscribers or purchasers, whereby the second set of WiFi hotspots offer free Google Voice VoIP service without QoS, and so on.

Still referring to 505 of FIG. 5, in another example, if a partnership between a particular VoIP provider and a VoIP bidder involves some degree of integration of phone numbers with VoIP IDs (e.g., Sprint with Google Voice, Verizon with Skype, etc.), the preferential performance and/or contract terms can permit VoIP calls to be made using 'normal' phone numbers (e.g., cellular phone numbers or landline phone numbers instead of VoIP IDs) for a reduced price or even for free. In a further example, a given VoIP bidder may wish to established preferential performance and/or contract terms within VoIP access network(s) (or DAPs) that serve a particular geographic region. For example, AT&T may decide to grant non-roaming subscribers VoIP calls that do not decrement the data plan balance. In this case, AT&T can encourage its subscribers to use particular VoIP providers for VoIP calls when operating in-network so that their data plans will not be depleted.

Referring to FIG. 5, a successfully negotiated set of preferential performance and/or contract terms for a particular VoIP access network (or DAP) may be referred to as a "preferred VoIP opportunity", whereby the preferred VoIP opportunity indicates the VoIP access network (or DAP) for which the set of preferential performance and/or contract terms has been negotiated, the associated VoIP service that is offering the negotiated set of preferential performance and/or contract terms as well as the negotiated set of preferential performance and/or contract terms itself (which may be referred to as the available terms for using the associated VoIP service on that particular VoIP access network or DAP).

At 510, the successful VoIP bidders deliver their negotiated preferential performance and/or contract terms to one or more target UEs, which then store the negotiated preferential performance and/or control terms (or "preferred VoIP opportunities") thereon. In an example, for a VoIP bidder corresponding to an OMH OEM, the one or more target UEs to which the VoIP bidders deliver the negotiated preferential performance and/or contract terms includes UEs that were manufactured by OMH OEM. Thus, if the OMH OEM corresponds to Samsung, then Samsung may provision its UEs with the negotiated preferential performance and/or contract terms for Samsung-manufactured UEs. In an alternative example, for a VoIP bidder corresponding to a VoIP provider (e.g., Skype, Google Voice, etc.), the negotiated preferential performance and/or contract terms can be delivered to the one or more target UEs when their client software is downloaded. Thus, in a Skype example, the negotiated preferential performance and/or contract terms can be packaged with a Skype client application that is downloaded (or pre-installed) onto the one or more target UEs. In another example, for a VoIP bidder corresponding to a cellular carrier network (e.g., Sprint, Verizon, etc.), the negotiated preferential performance and/or contract terms can be delivered to the one or more target UEs over the respective cellular carrier network.

Figure 6:
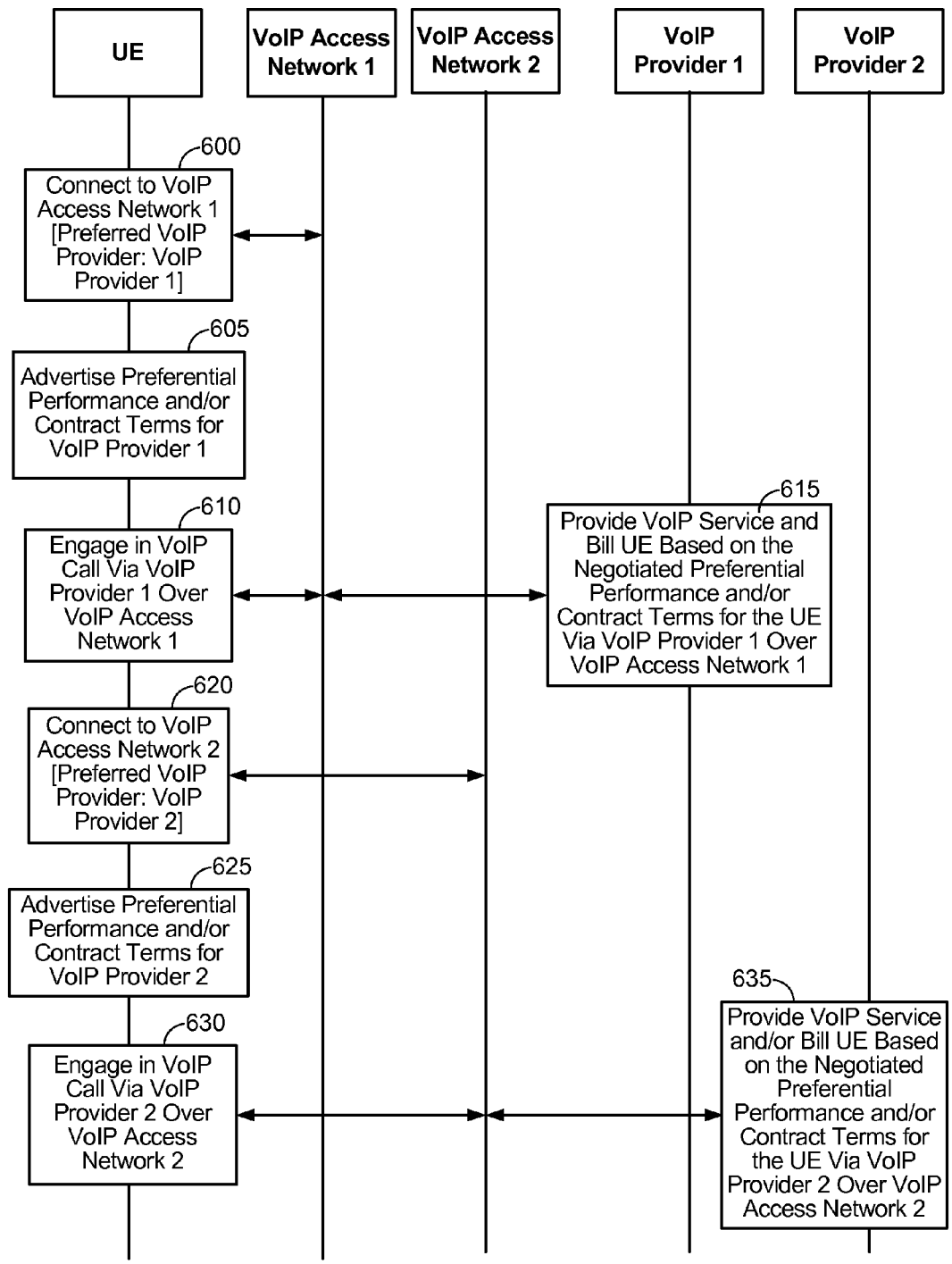
FIG. 6 illustrates a process of engaging in VoIP sessions by a given UE in accordance with an embodiment of the invention.

FIG. 6 illustrates a process of engaging in VoIP sessions by a given UE in accordance with an embodiment of the invention. In particular, assume that the process of FIG. 5 has executed and that the given UE has been provisioned with and is storing preferential performance and/or contract terms (or preferred VoIP opportunities) that are negotiated by at least one VoIP bidder associated with the given UE (e.g., VoIP access network, DAP or VoIP provider to which the given UE subscribes, an OMH OEM that manufactured the given UE, etc.).

Figure 7A:
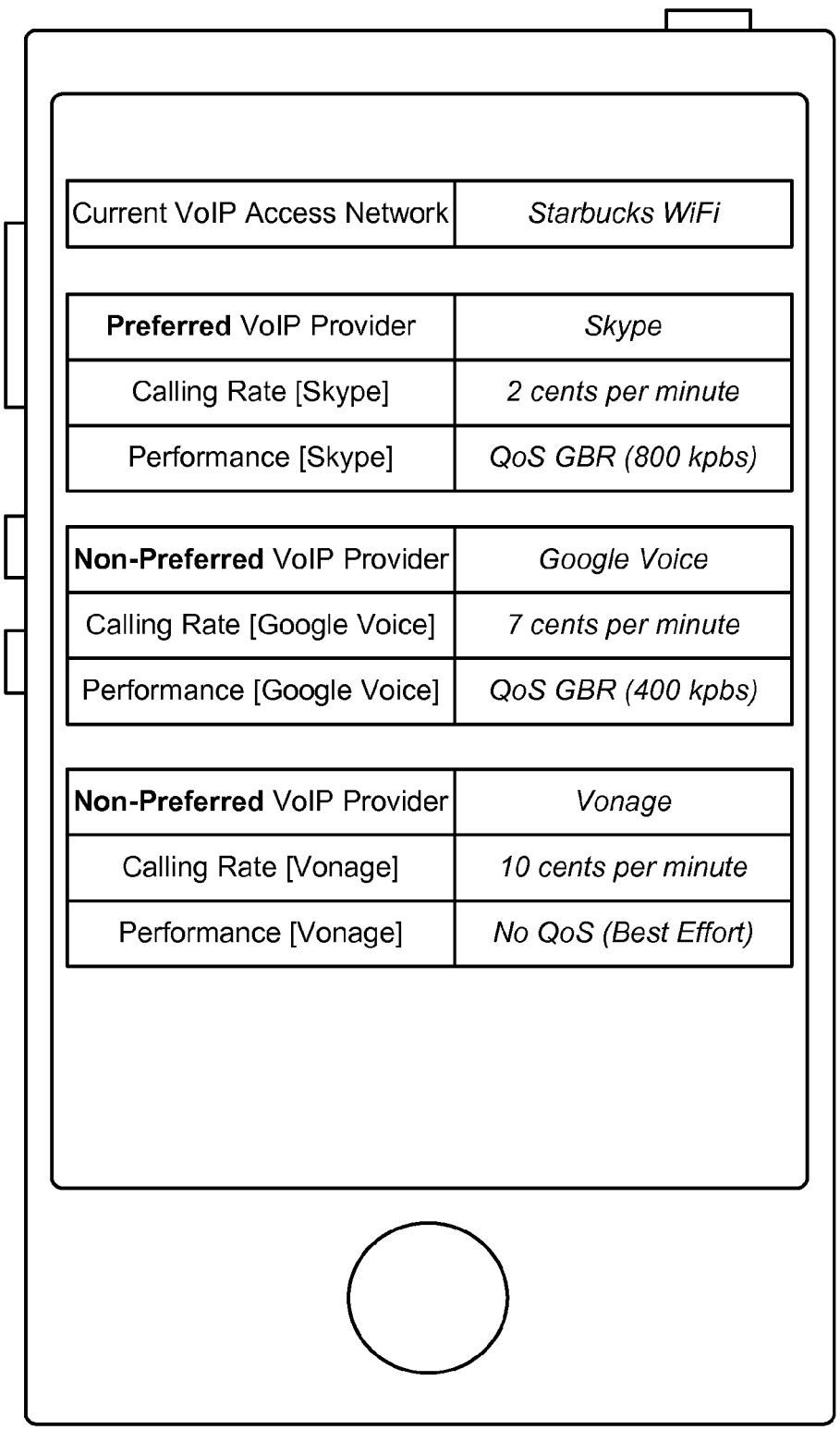
FIG. 7A illustrates a VoIP provider advertisement screen at the given UE in accordance with an embodiment of the invention.

Referring to FIG. 6, the given UE connects to VoIP access network 1 (e.g., a DAP such as a WiFi AP, a cellular data network, etc.), 600. In the embodiment of FIG. 6, assume that VoIP provider 1 is the preferred VoIP provider for VoIP access network 1 (e.g., either for the given UE specifically, a group of UEs that belong to the same cellular carrier or were manufactured by the same OEM, a group of UEs that subscribe to VoIP provider 1, all UEs that access VoIP access network 1, etc.). Accordingly, the given UE determines its connection to VoIP access network 1, identifies VoIP access network 1 to be associated with at least one VoIP opportunity (e.g., the set of preferential performance and/or contract terms for particular VoIP provider(s) over VoIP access network 1) and then advertises the preferential performance and/or contract terms associated with VoIP provider 1 to the user of the given UE, 605. In an example, at 605, the preferential performance and/or contract terms associated with VoIP provider 1 can be advertised as shown in FIG. 7A under the assumption that VoIP Access Network 1 is a Starbucks WiFi hotspot (under the further assumption that Starbucks has a WiFi-sharing arrangement with a particular VoIP bidder to use Skype), that VoIP Provider 1 is Skype and VoIP Provider 2 is Google Voice and that VoIP Provider 3 (not shown in FIG. 6) is Vonage. In FIG. 7A, the preferred VoIP opportunity corresponds to the indications of Starbucks WiFi as the VoIP access network or DAP, Skype as the associated VoIP service for the preferred VoIP opportunity, and the Skype calling rate and performance terms as the terms that are available for utilizing Skype over Starbucks WiFi.

In FIG. 7A, the advertized VoIP providers may be implemented as user-selectable icons, such that a user selection of the preferred VoIP provider (i.e., Skype) causes a Skype client application to be launched on the respective UE, while user selections of any of the non-preferred VoIP providers cause their respective client applications to be launched on the UE. As shown in FIG. 7A, so long as the given UE is connected to Starbucks WiFi, Skype is allocated a preferential contract term or calling rate (e.g., 2 cents per minute) as opposed to Google Voice or Vonage (e.g., 7 cents per minute and 10 cents per minute, respectively), and Skype is also allocated preferential performance (e.g., a guaranteed bit rate (GBR) QoS of 800 kpbs) as compared to Google Voice (e.g., a GBR QoS of 400 kpbs) or Vonage (e.g., no QoS). Accordingly, the user of the given UE is incentivized, but not necessarily forced, to use VoIP provider 1 while connected to VoIP access network 1.

While not shown in FIG. 7A, the user of the given UE can also optionally be notified with respect to why the given UE has qualified for the preferential performance level and pricing via Skype. In other words, the VoIP bidder (in this case, Samsung) may want the end users to credit them with providing the preferential performance level and pricing via Skype so as to build goodwill and improve customer sentiment. Thus, if Samsung was the VoIP bidder that paid VoIP access network 1 to grant its handsets preferential Skype conditions in VoIP access network 1, the user of the given UE may be notified of this fact (e.g., "Skype savings brought to you by Samsung", etc.).

Referring to FIG. 6, the advertising of 605 can occur in conjunction with the given UE establishing its connection to the VoIP access network 1 (e.g., so that the user of the given UE is aware of its current VoIP call environment and can be encouraged or discouraged from initiating VoIP calls). The advertising of 605 can alternatively (or cumulatively) occur in conjunction in response to a call set-up scenario, so that the advertisement is triggered in response to the user of the given UE attempting to set-up the VoIP call at 620 (e.g., so that the user can make smarter decisions at call set-up to improve VoIP call performance and/or to reduce VoIP call charges).

At 610, assume that the given UE engages in a VoIP call via VoIP provider 1 over VoIP access network 1, and that VoIP provider 1 provides VoIP service to the given UE and bills the given UE based on the preferential performance and/or contract terms for the given UE, 615. For example, if 615 is performed in accordance with the example of FIG. 7A, a Skype server may charge the given UE for the VoIP call based on a calling rate of 2 cents per minute while providing the given UE with a QoS GBR of 800 kpbs during the VoIP call.

Figure 7B:
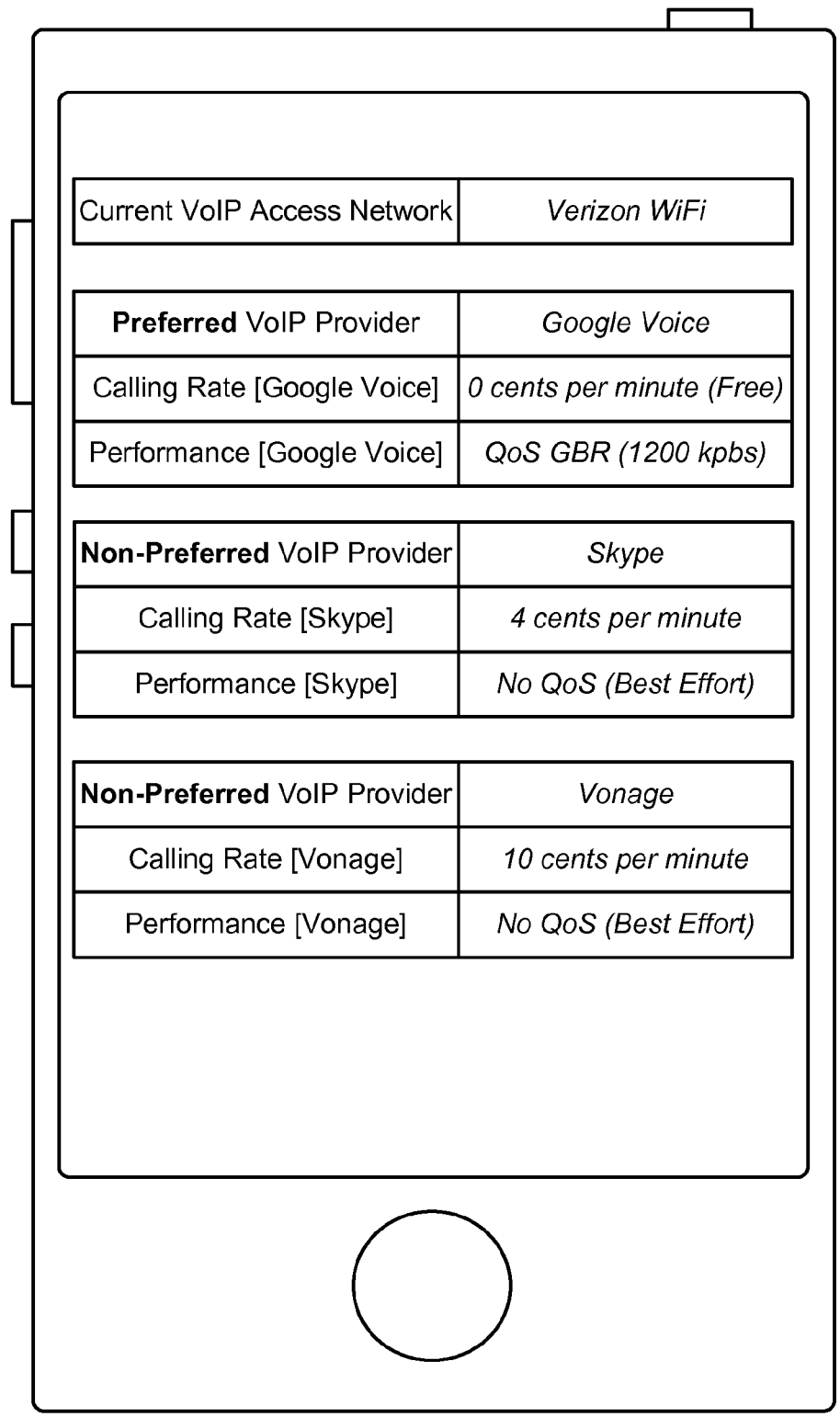
FIG. 7B illustrates another VoIP provider advertisement screen at the given UE in accordance with an embodiment of the invention.

Referring to FIG. 6, at some later point in time after the given UE's VoIP call from 610-615 is over, the given UE connects to VoIP access network 2 (e.g., a different WiFi AP, etc.), 620. In the embodiment of FIG. 6, assume that VoIP provider 2 is the preferred VoIP provider for VoIP access network 2 (e.g., either for the given UE specifically, a group of UEs that belong to the same cellular carrier or were manufactured by the same OEM, a group of UEs that subscribe to VoIP provider 2, all UEs that access VoIP access network 2, etc.). Accordingly, the given UE determines its connection to VoIP access network 2, identifies VoIP access network 2 to be associated with at least one VoIP opportunity (e.g., the set of preferential performance and/or contract terms for particular VoIP provider(s) over VoIP access network 2) and then the given UE advertises the preferential performance and/or contract terms associated with VoIP provider 2 to the user of the given UE, 625. In an example, at 625, the preferential performance and/or contract terms associated with VoIP provider 2 can be advertised as shown in FIG. 7B under the assumption that the VoIP access network 2 is a Verizon-operated WiFi network (under the further assumption that Verizon has an arrangement to deliver preferential settings for Google Voice), that VoIP provider 1 is Skype and VoIP provider 2 is Google Voice and that VoIP provider 3 (not shown in FIG. 6) is Vonage. In FIG. 7B, the preferred VoIP opportunity corresponds to the indications of Verizon WiFi as the VoIP access network or DAP, Google Voice as the associated VoIP service for the preferred VoIP opportunity, and the Google Voice calling rate and performance terms as the terms that are available for utilizing Google Voice over Verizon WiFi.

In FIG. 7B, the advertized VoIP providers may be implemented as user-selectable icons, such that a user selection of the preferred VoIP provider (i.e., Google Voice) causes a Google Voice client application to be launched on the respective UE, while user selections of any of the non-preferred VoIP providers cause their respective client applications to be launched on the UE. As shown in FIG. 6, so long as the given UE is connected to the Verizon-operated WiFi network, Google Voice is allocated a preferential contract term or calling rate (e.g., 0 cents per minute, or free) as opposed to Skype or Vonage (e.g., 4 cents per minute and 10 cents per minute, respectively), and Google Voice is also allocated preferential performance (e.g., a GBR QoS of 1200 kpbs) as compared to Skype (e.g., no QoS) or Vonage (e.g., no QoS). Accordingly, the user of the given UE is incentivized, but not necessarily forced, to use VoIP provider 2 while connected to VoIP access network 2.

While not shown in FIG. 7B, the user of the given UE can also optionally be notified with respect to why the given UE has qualified for the preferential performance level and pricing via the Verizon WiFi hotspot. In other words, the VoIP bidder (in this case, Verizon) may want the end users to credit them with providing the preferential performance level and pricing via Google Voice so as to build goodwill and improve customer sentiment. Thus, if Verizon was the VoIP bidder that paid to implement VoIP access network 2 so as to grant its handsets preferential Google Voice conditions in VoIP access network 2, the user of the given UE may be notified of this fact (e.g., "Google Voice savings brought to you by Verizon", etc.).

Referring to FIG. 6, similar to 605, the advertising of 625 can occur in conjunction with the given UE establishing its connection to the VoIP access network 2 (e.g., so that the user of the given UE is aware of its current VoIP call environment and can be encouraged or discouraged from initiating VoIP calls). The advertising of 625 can alternatively (or cumulatively) occur in conjunction in response to a call set-up scenario, so that the advertisement is triggered in response to the user of the given UE attempting to set-up the VoIP call at 630 (e.g., so that the user can make smarter decisions at call set-up to improve VoIP call performance and/or to reduce VoIP call charges).

At 630, assume that the given UE engages in a VoIP call via VoIP provider 2 over VoIP access network 2, and that VoIP provider 2 provides VoIP service to the given UE and bills the given UE based on the preferential performance and/or contract terms for the given UE, 635. For example, if 635 is performed in accordance with the example of FIG. 7B, a Google Voice server may refrain from charging the given UE (e.g., because Google Voice is shown in FIG. 7B to be a free service over Verizon WiFi hotspots) while providing the given UE with a QoS GBR of 1200 kpbs during the VoIP call.

As will be appreciated, there are numerous other potential implementations for FIG. 6 with respect to specific preferential performance and/or contract terms, and FIGS. 7A-7B are merely illustrative of two particular examples. In other examples, the VoIP access networks can correspond to cellular carrier networks (as oppose to WiFi hotspots), and so on. In this case, the preferential performance and/or contract terms can vary based in part on the class of VoIP access network (e.g., cellular, WiFi, etc.). For example, it may be cheaper or more practical for the VoIP bidder to negotiate higher levels of QoS with WiFi-based VoIP access networks as compared to cellular-based VoIP access networks, in which case the QoS negotiated for WiFi-based VoIP access networks may be higher as compared to the QoS negotiated for cellular-based VoIP access networks. Also, in other examples, the VoIP bidders can correspond to a VoIP provider instead of a VoIP access network or OMH OEM. A scenario where a VoIP provider (i.e., Skype) is the VoIP bidder is provided below with respect to FIG. 8B.

Figure 8A:
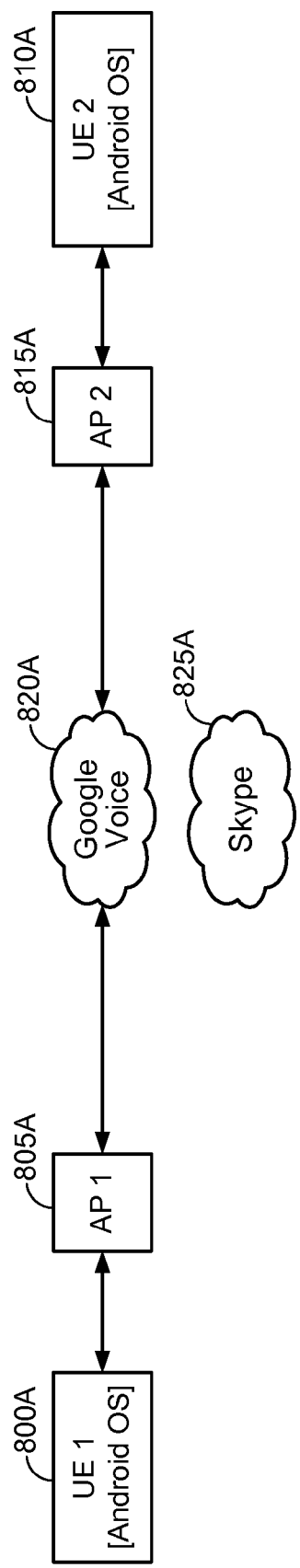
FIG. 8A illustrates a conventional scenario where a default VoIP established by an operating system (OS) is used for a VoIP call.

FIG. 8A illustrates a conventional scenario where a default VoIP provider (i.e., Google Voice) established by an operating system (OS) (i.e., Android) is used for a VoIP call. In FIG. 8A, a first UE 800A is served by a first AP 805A and a second UE 810A is served by a second AP 815A. The first and second UEs 800A and 805A are each Android OS devices, which are configured by Google to have Google Voice as the default VoIP provider for any VoIP calls. Thus, the first and second UEs 800A and 805A are shown as engaged in a Google Voice VoIP call mediated by a Google Voice server 820A as opposed to a Skype server 825A. Even if both the first and second UEs 800A and 805A were Skype subscribers, for instance, Skype conventionally would have little way to incentivize the use of its VoIP service in a targeted manner to Android OS devices.

Figure 8B:
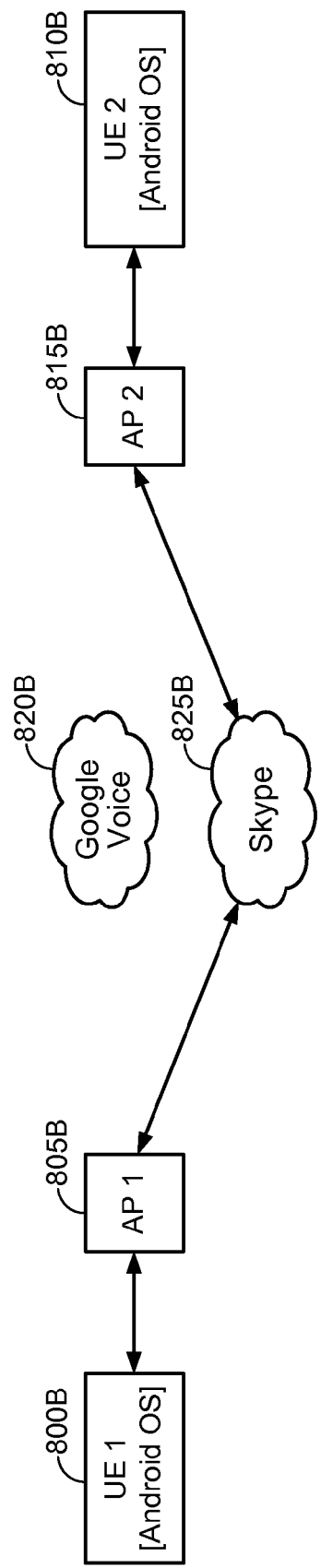
FIG. 8B illustrates a use case based on an execution of FIGS. 5-6 where a VoIP provider can negotiate with particular VoIP access networks to offer preferential service so as to incentivize the use of its VoIP service in accordance with an embodiment of the invention.

FIG. 8B illustrates a use case based on an execution of FIGS. 5-6 where a VoIP provider (i.e., Skype) can negotiate with particular VoIP access networks to offer preferential service so as to incentivize the use of its VoIP service. In FIG. 8B, 800B through 825B correspond to 800A through 825A from FIG. 8A, and will not be described further for the sake of brevity. In FIG. 8B, the Android OS UEs 800A and 805B are shown as using the Skype VoIP service instead of the Google Voice VoIP service, and this action can be encouraged via the use of preferential VoIP performance and/or contact terms on particular VoIP access networks, which can be negotiated by Skype using the process of FIG. 5 and then implemented using the process of FIG. 6.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a user equipment (UE) that subscribes to multiple Voice over Internet Protocol (VoIP) services provided by a plurality of VoIP providers, comprising:
   receiving, by a processor of the UE, a first set of negotiated preferential performance and/or contract terms for engaging in VoIP calls over a first set of VoIP access networks;
   associating, by the processor of the UE, a first VoIP provider of the plurality of VoIP providers as a preferred VoIP provider for the first set of VoIP access networks based on the first set of negotiated preferential performance and/or contract terms;
   determining, by the processor of the UE, that the UE is connected to a first VoIP access network of the first set of VoIP access networks; and
   engaging, by the processor of the UE in response to determining that the UE is connected to the first VoIP access network, in a VoIP call over the first VoIP access network using the preferred VoIP provider that is associated with the first VoIP access network.

2. The method of claim 1, further comprising:
   presenting, by the processor of the UE in response to determining that the UE is connected to the first VoIP access network, to a user of the UE the first set of negotiated preferential performance and/or contract terms that are avialable to the UE via the first VoIP provider over the first VoIP access network.

3. The method of claim 1, wherein the first set of negotiated preferential performance and/or contract terms are negotiated between one or more of a cellular carrier to which the UE subscribes, a given VoIP access network to which the UE subscribes, and an original equipment manufacturer (OEM) of the UE.

4. The method of claim 2, wherein the presenting, by the processor of the UE in response to determining that the UE is connected to the first VoIP access network, to a user of the UE the first set of negotiated preferential performance and/or contract terms that are available to the UE via the first VoIP provider over the first VoIP access network comprises:
   presenting, by the processor of the UE, the first set of negotiated preferential performance and/or contract terms in association with one or more other sets of performance and/or contract terms associated with one or more other VoIP providers.

5. The method of claim 2, further comprising:
   receiving, by the processor of the UE, a second set of negotiated preferential performance and/or contract terms for engaging in VoIP calls over a second set of VoIP access networks;
   associating, by the processor of the UE, a second VoIP provider of the plurality of VoIP providers as the preferred VoIP provider for the second set of VoIP access networks based on the second set of negotiated preferential performance and/or contract terms;
   determining, by the processor of the UE, that the UE is connected to a second VoIP access network that belongs to the second set of VoIP access networks; and
   presenting, by the processor of the UE in response to determining that the UE is connected to the second VoIP access network, to the user of the UE the second set of negotiated preferential performance and/or contract terms that are available to the UE via the second VoIP provider over the second VoIP access network.

6. The method of claim 5,
   wherein the first set of negotiated preferential performance and/or contract terms include a first level of Quality of Service (QoS), and
   wherein the second set of negotiated preferential performance and/or contract terms include a second level of QoS different from the first level of QoS.

7. The method of claim 6,
   wherein the first level of QoS is higher than the second level of QoS,
   wherein the first set of VoIP access networks is associated with Wi-Fi-based VoIP access networks, and
   wherein the second set of VoIP access networks is associated with cellular-based VoIP access networks.

8. The method of claim 1, further comprising:
   detecting, by the processor of the UE, an attempt by the user of the UE to initiate the VoIP call while the UE is connected to the first VoIP access network.

9. The method of claim 8, wherein the presenting is performed in response to the detection.

10. The method of claim 8, wherein a VoIP client application configured to manage the VoIP calls mediated through the first VoIP provider is launched automatically in response to the detection based on the first VoIP provider being the preferred VoIP provider for the UE while the UE is operating over the first VoIP access network.

11. The method of claim 1, wherein the presenting presents the first set of negotiated preferential performance and/or contract terms in conjunction with a user-selectable icon that is configured to launch a VoIP client application configured to manage the VoIP calls mediated through the first VoIP provider.

12. The method of claim 1, wherein the first set of negotiated preferential performance and/or contract terms include decreased VoIP billing rates by the first VoIP provider, decreased data rate charges by a cellular carrier network and/or Quality of Service (QoS).

13. The method of claim 1, wherein the first set of VoIP access networks corresponds to VoIP access networks controlled by and/or under a contractual agreement with (i) a cellular carrier network to which the UE subscribes, (ii) an original equipment manufacturer (OEM) of the UE or (iii) the first VoIP provider.

14. The method of claim 1, wherein the first set of VoIP access networks includes Wi-Fi networks and/or Wide Area Network (WAN) networks.

15. The method of claim 1,
wherein the first set of VoIP access networks corresponds to a non-roaming portion of a cellular carrier's radio access network, and
wherein a second set of VoIP access networks corresponding to a roaming portion of the cellular carrier's radio access network is not associated with the first set of negotiated preferential performance and/or contract terms.

16. A method of operating a user equipment (UE) configured to access a plurality of Voice over Internet Protocol (VoIP) services, comprising:
receiving, by a processor of the UE, data indicating a plurality of preferred VoIP opportunities in response to a negotiation procedure;
storing, by the processor of the UE, the received plurality of preferred VoIP opportunities, each of the plurality of preferred VoIP opportunities indicating a given data access provider, an associated VoIP service, and terms that are available for utilizing the associated VoIP service via the given data access provider;
determining, by the processor of the UE, that the UE is connected to a first data access provider;
identifying, by the processor of the UE, at least one preferred VoIP opportunity that indicates the first data access provider in response to the determination; and
presenting, by the processor of the UE, to a user of the UE, at least the terms indicated by the identified at least one preferred VoIP opportunity that are available via a VoIP service associated with the identified at least one preferred VoIP opportunity while the UE is connected to the first data access provider.

17. The method of claim 16, wherein the presenting further includes:
presenting, by the processor of the UE, to the user of the UE, at least one additional set of terms associated with at least one other VoIP service that is available to the UE via the first data access provider.

18. The method of claim 17, wherein the at least one other VoIP service is associated with the first data access provider in at least one of the plurality of preferred VoIP opportunities.

19. The method of claim 17, wherein the at least one other VoIP service is not associated with the first data access provider in at least one of the plurality of preferred VoIP opportunities.

20. The method of claim 16, further comprising:
determining, by the processor of the UE, that the UE is connected to a second data access provider;
identifying, by the processor of the UE, one or more preferred VoIP opportunities that indicate the second data access provider in response to the determination that the UE is connected to the second data access provider; and
presenting, by the processor of the UE, to the user of the UE, at least the terms indicated by the identified one or more preferred VoIP opportunities that are available if the user elects to utilize a second VoIP service associated with the identified one or more preferred VoIP opportunities while connected to the second data access provider.

21. A user equipment (UE) that subscribes to multiple Voice over Internet Protocol (VoIP) services provided by a plurality of VoIP providers, comprising:
means for receiving a first set of negotiated preferential performance and/or contract terms for engaging in VoIP calls over a first set of VoIP access networks;
means for associating a first VoIP provider of the plurality of VoIP providers as a preferred VoIP provider for the first set of VoIP access networks based on the first set of negotiated preferential performance and/or contract terms;
means for determining that the UE is connected to a first VoIP access network of the first set of VoIP access networks;
means for engaging, in response to determining that the UE is connected to the first VoIP access network, in a VoIP call over the first VoIP access network
using the preferred VoIP provider that is associated with the first VoIP access network.

22. A user equipment (UE) configured to access a plurality of Voice over Internet Protocol (VoIP) services, comprising:
means for receiving data indicating a plurality of preferred VoIP opportunities in response to a negotiation procedure;
means for storing the received plurality of preferred VoIP opportunities, each of the plurality of preferred VoIP opportunities indicating a given data access provider, an associated VoIP service, and terms that are available for utilizing the associated VoIP service via the given data access provider;
means for determining that the UE is connected to a first data access provider;
means for identifying at least one preferred VoIP opportunity that indicates the first data access provider in response to the determination; and
means for presenting, to a user of the UE, at least the terms indicated by the identified at least one preferred VoIP opportunity that are available via a VoIP service associated with the identified at least one preferred VoIP opportunity while the UE is connected to the first data access provider.

23. A user equipment (UE) that subscribes to multiple Voice over Internet Protocol (VoIP) services provided by a plurality of VoIP providers, comprising:
a memory; and
a processor coupled to the memory, wherein the processor is configured with processor-executable instructions to perform operations comprising:
receiving a first set of negotiated preferential performance and/or contract terms for engaging in VoIP calls over a first set of VoIP access networks;
associating a first VoIP provider of the plurality of VoIP providers as a preferred VoIP provider for the first set of VoIP access networks based on the first set of negotiated preferential performance and/or contract terms;

determining that the UE is connected to a first VoIP access network of the first set of VoIP access networks; and engaging, in response to determining that the UE is connected to the first VoIP access network, in a VoIP call over the first VoIP access network using the preferred VoIP provider that is associated with the first VoIP access network.

24. A user equipment (UE) configured to access a plurality of Voice over Internet Protocol (VoIP) services, comprising:

a memory; and a processor coupled to the memory, wherein the processor is configured with processor-executable instructions to perform operations comprising:

receiving data indicating a plurality of preferred VoIP opportunities in response to a negotiation procedure;

storing the plurality of preferred VoIP opportunities, each of the plurality of preferred VoIP opportunities indicating a given data access provider, an associated VoIP service, and terms that are available for utilizing the associated VoIP service via the given data access provider;

determining that the UE is connected to a first data access provider;

identifying at least one preferred VoIP opportunity that indicates the first data access provider in response to the determination; and presenting, to a user of the UE, at least the terms indicated by the identified at least one preferred VoIP opportunity that are available via a VoIP service associated with the identified at least one preferred VoIP opportunity while the UE is connected to the first data access provider.

25. A non-transitory computer-readable medium containing processor-executable instructions stored thereon configured to cause a processor of a user equipment (UE) that subscribes to multiple Voice over Internet Protocol (VoIP) services provided by a plurality of VoIP providers to perform operations comprising:

receiving a first set of negotiated preferential performance and/or contract terms for engaging in VoIP calls over a first set of VoIP access networks;

associating a first VoIP provider of the plurality of VoIP providers as a preferred VoIP provider for the first set of VoIP access networks based on the first set of negotiated preferential performance and/or contract terms;

determining that the UE is connected to a first VoIP access network of the first set of VoIP access networks; and engaging, in response to determining that the UE is connected to the first VoIP access network, in a VoIP call over the first VoIP access network using the preferred VoIP provider that is associated with the first VoIP access network.

26. A non-transitory computer-readable medium containing processor-executable instructions stored thereon configured to cause a processor of a user equipment (UE) configured to access a plurality of Voice over Internet Protocol (VoIP) services to perform operations comprising:

receiving data indicating a plurality of preferred VoIP opportunities in response to a negotiation procedure;

storing the plurality of preferred VoIP opportunities, each of the plurality of preferred VoIP opportunities indicating a given data access provider, an associated VoIP service, and terms that are available for utilizing the associated VoIP service via the given data access provider;

determining that the UE is connected to a first data access provider;

identifying at least one preferred VoIP opportunity that indicates the first data access provider in response to the determination; and presenting, to a user of the UE, at least the terms indicated by the identified at least one preferred VoIP opportunity that are available via a VoIP service associated with the identified at least one preferred VoIP opportunity while the UE is connected to the first data access provider.

\* \* \* \* \*

UNITED STATES PATENT AND TRADEMARK OFFICE
CERTIFICATE OF CORRECTION

| | | |
|---|---|---|
| PATENT NO. | : 9,241,286 B2 | Page 1 of 1 |
| APPLICATION NO. | : 13/794547 | |
| DATED | : January 19, 2016 | |
| INVENTOR(S) | : Menendez et al. | |

It is certified that error appears in the above-identified patent and that said Letters Patent is hereby corrected as shown below:

In the Claims

In Column 16, Lines 60-61, in Claim 9, delete "9. The method of claim 8, wherein the presenting is performed in response to the detection." and insert --9. The method of claim 2, wherein the presenting is performed in response to detecting, by the processor or the UE, an attempt by the user of the UE to initiate the VoIP call while the UE is connected to the first VoIP access network.--.

In Column 17, Line 1, in Claim 11, delete "11. The method of claim 1, wherein the presenting presents" and insert --11. The method of claim 2, wherein the presenting presents--.

Signed and Sealed this
Thirty-first Day of May, 2016

Michelle K. Lee
*Director of the United States Patent and Trademark Office*